United States Patent [19]

Yowa

[11] 4,317,281
[45] Mar. 2, 1982

[54] NUT OPENER

[76] Inventor: Anthony Yowa, 4633 Skyline Dr., Ft. Collins, Colo. 80526

[21] Appl. No.: 124,639

[22] Filed: Feb. 25, 1980

[51] Int. Cl.³ .............................................. A47J 43/26
[52] U.S. Cl. .................. 30/120.2; 30/113.1; 30/324
[58] Field of Search ................ 30/120.1, 113.1, 113.3, 30/149, 324, 120.2, 120.3, 120.4, 120.5

[56] References Cited

U.S. PATENT DOCUMENTS

| | | | |
|---|---|---|---|
| D. 47,443 | 6/1915 | Villemain | 30/149 |
| D. 132,441 | 5/1942 | Graves | 30/324 |
| D. 193,542 | 9/1962 | Gordon | 30/324 |
| D. 193,543 | 9/1962 | Gordon | 30/324 |
| 908,894 | 1/1909 | Smiley | 30/149 |
| 1,192,659 | 7/1916 | Malloy | 30/324 |
| 1,438,418 | 12/1922 | Woods | 30/113.1 |
| 1,516,683 | 11/1924 | Phare | 30/113.3 |
| 1,629,131 | 5/1927 | Sullivan | 30/113.3 |
| 1,644,119 | 10/1927 | Fowler | 30/120.1 |
| 1,720,575 | 7/1929 | Smith | 30/120.2 |
| 2,291,981 | 8/1942 | Neururer | 30/324 |
| 2,401,534 | 6/1946 | Welch | 30/324 |
| 2,461,524 | 2/1949 | Cook | 30/120.2 |
| 2,653,638 | 9/1953 | Nelson | 30/120.2 |
| 3,074,449 | 1/1963 | Mikulas | 30/120.2 |

FOREIGN PATENT DOCUMENTS

| | | | |
|---|---|---|---|
| 666345 | 10/1938 | Fed. Rep. of Germany | 30/120.2 |
| 2404348 | 8/1975 | Fed. Rep. of Germany | 30/324 |
| 2343460 | 10/1977 | France | 30/120.2 |
| 22952 | of 0000 | United Kingdom | 30/324 |

Primary Examiner—Jimmy C. Peters
Assistant Examiner—J. T. Zatarga
Attorney, Agent, or Firm—Hugh H. Drake

[57] ABSTRACT

A pocket-sized nut opener serves for separating the shell of a pistachio or similar nut that has an obloid shape and is composed of a mating pair of half shells which enclose a nutmeat and define therebetween a narrow slit. The opener is in the form of a generally spoon-shaped implement with a contour that approximates that of a substantial portion of one of those half shells, the implement defining a tip portion and a base portion opposite the tip portion. A generally flat tab is joined to and projects integrally away from the base portion outwardly from the implement. The tab is of a size to be comfortably grasped merely between a thumb and forefinger of a user when inserting the tip portion into the slit and prying the half shells apart.

4 Claims, 7 Drawing Figures

NUT OPENER

The present invention relates to a nut opener. More particularly, it pertains to an opener for separating the shells of and retrieving the nutmeat from a pistachio nut or the like.

The pistachio nut is desired as a snack by a significant portion of the consuming public. The nuts typically are about ⅝" long and half that in diameter at their middle. As purchased by the user in bagged form, there is a very small slit in the shell at one end of the nut. Often, the user employs the fingenails of his two thumbs to pry apart the two halves of the shell. Of course, that can lead to the breaking of thumbnails or at least to a wedging of shell fragments or nutmeat beneath the nails.

Pliers-like implements are known for cracking or causing the springing apart of the half shells of various nuts. Howeve, these devices usually are sized and designed to enable the opening of the shells of comparatively large species such as walnuts and almonds. Often, the user of those implements also employs a separate nut pick, a slender and sharply pointed instrument, to remove the nutmeat after the shell portions have been broken apart. Those implements are comparatively large and intended to be operated by the grasping of an elongated handle or handles within substantially the entire hand of the user.

Various other implements have been devised for working with other foodstuffs. For example, U.S. Pat. No. 908,894—Smiley discloses a pointed spoon attached to a handle of elongated and rounded shape that is of a size to be clenched within the entire hand for the purpose of working the spoon to remove the stem and peel from tomatoes. To remove the pits from cherries, U.S. Pat. No. 1,203,600—French teaches the formation of a small curved pick that projects outwardly from a sleeve receivable on a finger of the user. For removing the kernels from small fruits, such as cherries or grapes, U.S. Pat. No. 1,438,418—Woods discloses an implement in the form of a spoon which merges into a curved shank and then continues on into an elongated handle again meant to be grasped in the entire hand of the user somewhat analogous to the device of Smiley. None of these prior devices appear to address the opening of the shell of pistachio nuts or the like by means of an implement which is both small in size and simple of manufacture.

It is, accordingly, a general object of the present invention to provide a new and improved nut opener which is advantageous in the field of concern.

It is another object of the present invention to provide a new and improved nut opener which is fully efficacious for the class of nuts concerned and yet which is readily carried, for example, within a pocket like a coin, key or whatever.

In accordance with the invention, a nut opener is intended for use in separating the shells of a nut that has an obloid shape and is composed of a mating pair of half shells which enclose a nutmeat and define therebetween a narrow slit. The opener includes a generally spoon-shaped implement having a contour approximating that of a substantial portion of one of the half shells and defining a tip portion and a base portion opposite the tip portion. A generally flat tab is joined to and projects integrally away from the base portion outwardly from the implement. The tab is of a size to be comfortably grasped merely between a thumb and forefinger of a user when inserting the tip portion into the slit and prying the half shells apart.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 6:
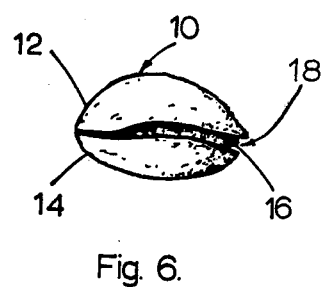
FIG. 6 is an isometric view of an unopened pistachio nut.

Referring first to FIG. 6, a pistachio nut 10 has an obloid shaped shell composed of a mating pair of hollow half shells 12 and 14 which enclose a nutmeat 16 and define therebetween, toward one end of nut 10, a narrow slit 18. Such nuts are grown in the United States in California and have heretofore been imported in significant quantities from far-eastern countries. They often are purchased by members of the consuming public as packaged in plastic bags or the like and in quantities of one pound or less. The consumer often opens the nuts one at a time for the purpose of eating the nutmeat.

For separating half shells 12 and 14 and retrieving nutmeat 16, an implement 20 is generally spoon-shaped and has a contour approximating that of a substantial portion of one of half shells 12 and 14. That contour defines a tip portion 22 and a base portion 24 which is opposite the tip portion. A generally flat tab 26 is joined to and projects integrally away from base portion 24 outwardly from implement 20. Tab 26 is of a size to be comfortably grasped merely between a thumb and forefinger of a user when inserting tip portion 22 into slit 18 and prying half shells 12 and 14 apart.

It will be observed from the figures in the drawings that tip portion 22 is sharply pointed at its front. Tab 26 is of generally semi-circular configuration and is connected to the rear portion of and centered on the centerline of the elongated spoon bowl of implement 20. The edge margins of the rear portion of that spoon bowl flare outwardly and smoothly merge with the edge margin of tab 26. The diameter of tab 26 is approximately equal to the length of the spoon bowl portion of implment 20. As indicated above, the top surface of tab 26, which corresponds to the same side of the overall device as that of the open top of the spoon bowl, is depressed to accommodate securely the thumb of the user during manipulation of the implement while opening the nut and scooping out therefrom the nut meat.

Figure 7:
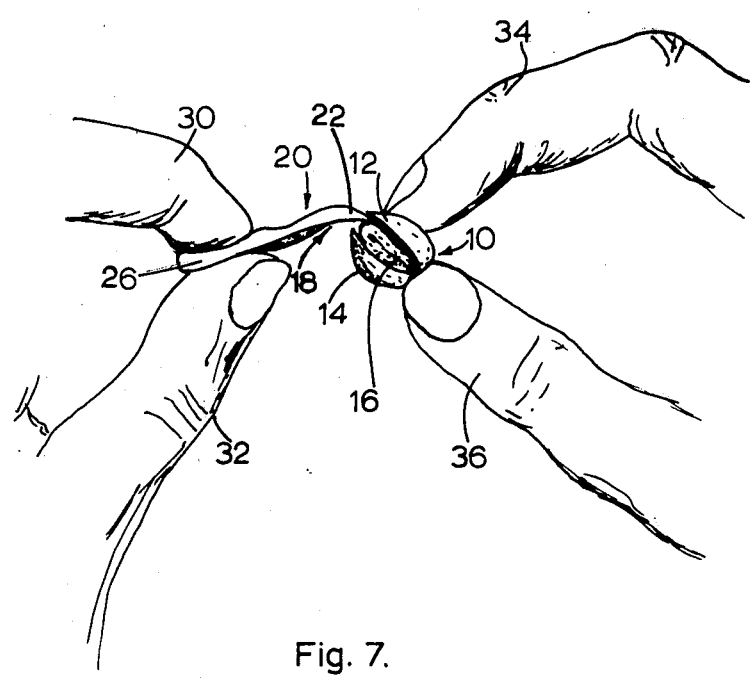
FIG. 7 is a fragmentary pictorial view illustrating use of the implement of FIGS. 1-5 to open a nut such as shown in FIG. 6.

In typical use as shown in FIG. 7, tab 26 is held between the index finger 30 and the thumb 32 of the left hand of a user, while nut 10 is held between the other index finger 34 and the other thumb 36 of that user.

After tip portion 22 has been inserted within slit 18, the user manipulates implement 20 so as to pry half shells 12 and 14 apart and thereby expose nutmeat 16. Sometimes, the mere prying apart of half shells 12 and 14 is sufficient to free nutmeat 16 so that it may be dislodged by use of a finger and thumb and placed into the mouth of the user. At other times, nutmeat 16 tends to remain secure within one of the half shells. For that situation, the width of the spoon-shaped portion of implement 20 is sufficiently slim to permit tip portion 22 to be scooped into the retaining one of half shells 12 and 14 thereby to remove nutmeat 16 therefrom.

To enhance the degree of frictional gripping available, tab 26 preferably is scored on its upper surface as indicated at 40. Further to the attainment of secure gripping between a thumb and forefinger, the central region 42 of that upper tab surface, between the lateral edge margins 44 and 46 thereof, is dished out to define a depression receptive of the lower end portion of thumb 32 of the user as illustrated in FIG. 7. It will be observed that tab 26 is generally fan shaped, edge margins 44 and 46 flaring apart in a direction proceeding away from base portion 24.

Also included in tab 26, near the outer margin thereof, is an aperture 48. Aperture 48 may be used for suspending implement 20 from a key chain or the like carried within the pocket of the user.

Figure 2:
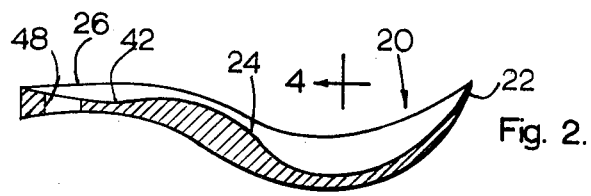
FIG. 2 is a cross-sectional view taken along the line 2—2 in FIG. 1.
Figure 3:
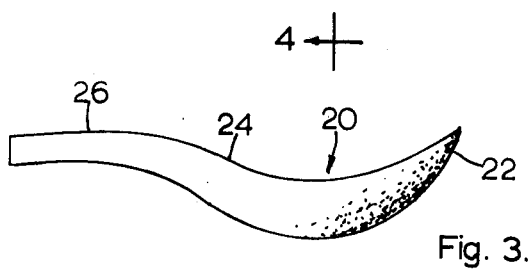
FIG. 3 is a side-elevational view of the opener shown in FIG. 1.
Figure 5:
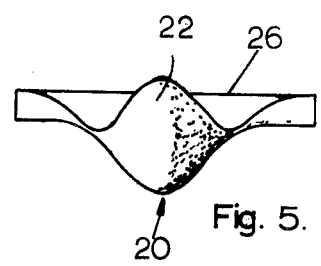
FIG. 5 is a side-elevational view taken from the right in FIG. 1.
Figure 4:
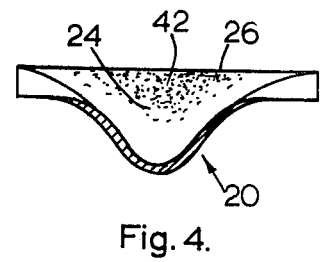
FIG. 4 is a cross-sectional view taken along the line 4—4 in FIG. 2.

Instead of being brought to a sharply pointed upright end as best shown in FIG. 2, tip portion 22 may, if desired, be merged into an outwardly projecting lip that is disposed around the rim of that tip portion.

Figure 1:
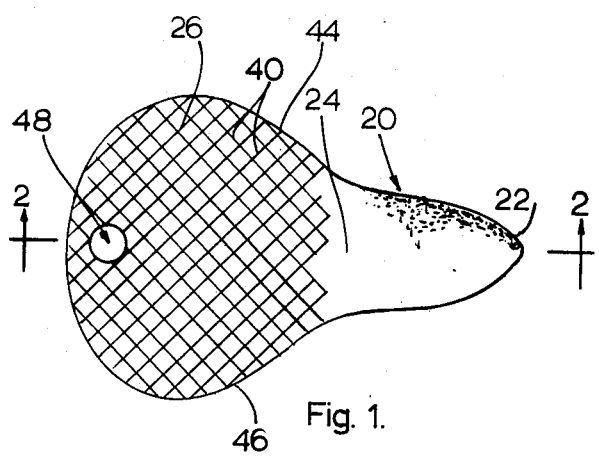
FIG. 1 is a top plan view of a nut opener formed in accordance with one embodiment of the present invention.

In fabricating implement 20 with its included tab 26, conventional molding of a suitable plastic material is contemplated. However, the implement may instead be pressed from sheet stock of a metallic material. In any case, it may be noted that, as specifically embodied for the use with pistachio nuts, the scale of the drawing in FIG. 1 of this application as submitted is approximately twice actual size. Accordingly, and as can be observed also by reference to the relative dimensions shown in FIG. 7, the overall length of implement 20 together with tab 26 approximates the length of the distal section of an adult human thumb and the width of tab 26 approximates the width of such distal section. Thus, the resulting implement is no larger than that of a coin or small key that the user otherwise normally might be carrying in his pocket. Accordingly, the device may be carried by the user conveniently at all times so as to be available whenever desired. Being so simple of ultimate fabrication, it is apparent that the implement may be easily manufactured and even packaged as an accessory to the supply of the nuts themselves.

While a particular embodiment of the invention has been shown and described, and one or more modifications have been disclosed, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. An implement for opening pistachio nuts or the like comprising:
    an elongated spoon bowl having a sharply pointed front tip portion;
    a generally semi-circular tab connected to the rear portion of and centered on the center line of the spoon bowl;
    the edge margins of the rear portion of the spoon bowl flaring outwardly and smoothly merging with the edge margin of the generally semi-circular tab;
    the diameter of the generally semi-circular tab being approximately equal to the length of the elongated spoon bowl;
    and the top surface of the generally semi-circular tab, which corresponds to the same side of the implement as that of the open top of the spoon bowl, being depressed to accommodate the thumb of the user during the manipulation of the implement while opening the nut and scooping outer therefrom the nutmeat.

2. An implement for opening pistachio nuts or the like comprising:
    an elongated spoon bowl having a sharply pointed front tip portion;
    a generally semi-circular tab connected to the rear portion of and centered on the center line of the spoon bowl;
    the edge margins of the rear portion of the spoon bowl flaring outwardly and smoothly merging with the edge margin of the generally semi-circular tab;
    the diameter of the generally semi-circular tab being approximately equal to the length of the elongated spoon bowl;
    and a surface of said generally semi-circular tab securely accommodating a thumb or forefinger of the user during the manipulation of the implement while opening the nut and scooping out therefrom the nutmeat.

3. An opener as defined in claim 1 or 2 in which at least one of the generally flat surfaces of said tab is scored.

4. An opener as defined in claim 1 or 2 in which said tab includes means defining an aperture disposed through said tab near the outer margin thereof remote from said tip portion.

* * * * *